(12) United States Patent
Micheletti

(10) Patent No.: US 6,267,190 B1
(45) Date of Patent: Jul. 31, 2001

(54) SMALL ELECTRIC VEHICLE

(75) Inventor: Edi Micheletti, Poncarale (IT)

(73) Assignee: Biga' Italia S.r.l., Poncarale (IT)

( * ) Notice: Subject to any disclaimer, the term of this patent is extended or adjusted under 35 U.S.C. 154(b) by 0 days.

(21) Appl. No.: 09/481,346

(22) Filed: Jan. 12, 2000

Related U.S. Application Data

(63) Continuation of application No. 08/933,893, filed on Sep. 19, 1997, now abandoned.

Foreign Application Priority Data

Sep. 20, 1996 (IT) .............................. MI96A01936

(51) Int. Cl.[7] .......................... B60K 28/04; B62D 51/02; B62D 61/08; B62M 27/02
(52) U.S. Cl. ......................... 180/183; 180/196; 180/216; 180/217; 180/65.1; 180/273
(58) Field of Search .................................. 180/215, 216, 180/217, 210, 65.1, 65.8, 273, 908, 183, 196; 280/DIG. 5

(56) References Cited

U.S. PATENT DOCUMENTS

| | | | |
|---|---|---|---|
| 3,512,599 | * 5/1970 | Hott et al. ............................ | 180/217 |
| 4,336,860 | * 6/1982 | Noller et al. .......................... | 180/273 |
| 4,558,263 | * 12/1985 | Harris et al. .......................... | 180/211 |
| 4,570,732 | * 2/1986 | Craven ................................. | 180/65.1 |
| 4,573,549 | * 3/1986 | Pankow ................................ | 180/216 |
| 4,607,199 | * 8/1986 | Krueger et al. ....................... | 180/273 |
| 4,869,336 | * 9/1989 | Nakasaki et al. ..................... | 180/196 |
| 4,874,055 | * 10/1989 | Beer ...................................... | 180/215 |
| 5,610,814 | * 3/1997 | Sugioka et al. ....................... | 180/273 |
| 5,912,545 | * 6/1999 | Monet et al. .......................... | 320/107 |

* cited by examiner

*Primary Examiner*—Peter C. English
(74) *Attorney, Agent, or Firm*—Bucknam and Archer

(57) ABSTRACT

A small electric vehicle is provided including a frame formed of a plurality of tubular elements, a tubular element connected to the front of the frame and supporting a handle bar and steerable front wheel or runner, a pair of driven rear wheels connected to the rear of the frame, a board fixed to the frame between the rear wheels for supporting a standing occupant, a switch having a contact pin protruding from an upper surface of the board, an electric motor connected to the rear wheels, and a microprocessor connected to the motor, the switch, a battery, a battery charger and a knob on the handle bar for controlling the motor in response to rotation of the knob.

12 Claims, 9 Drawing Sheets

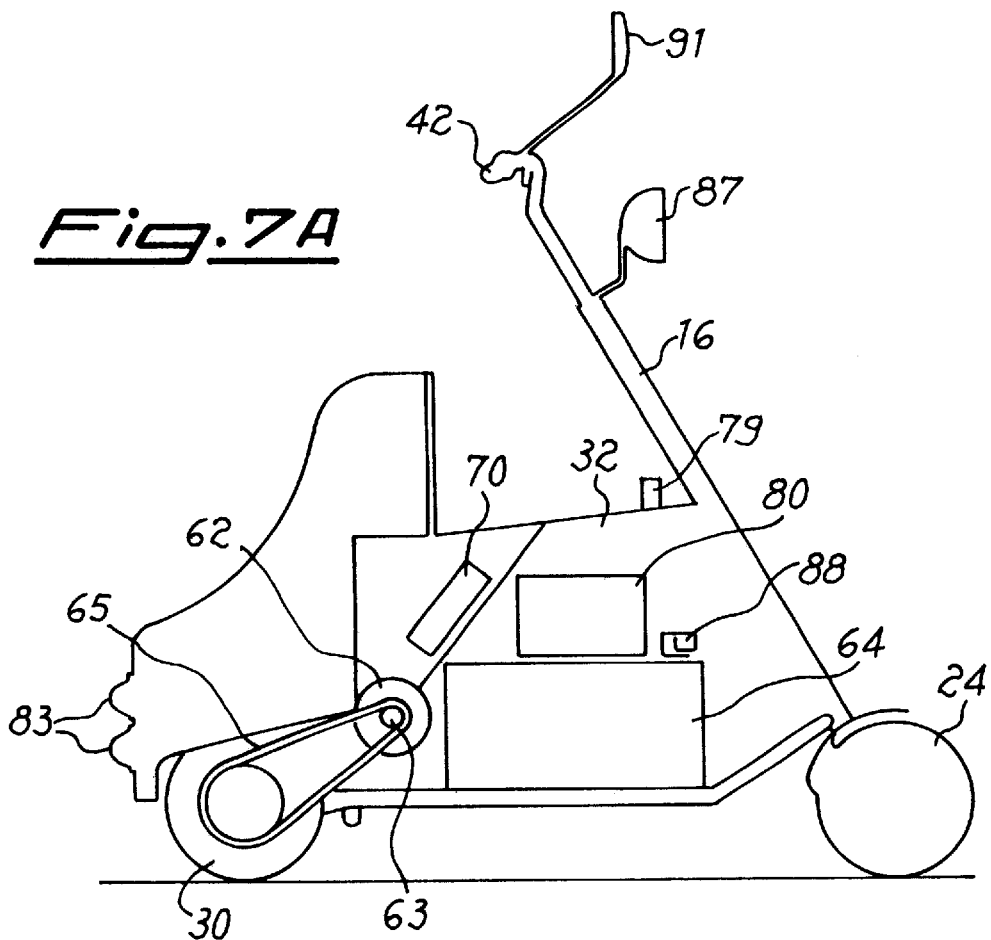
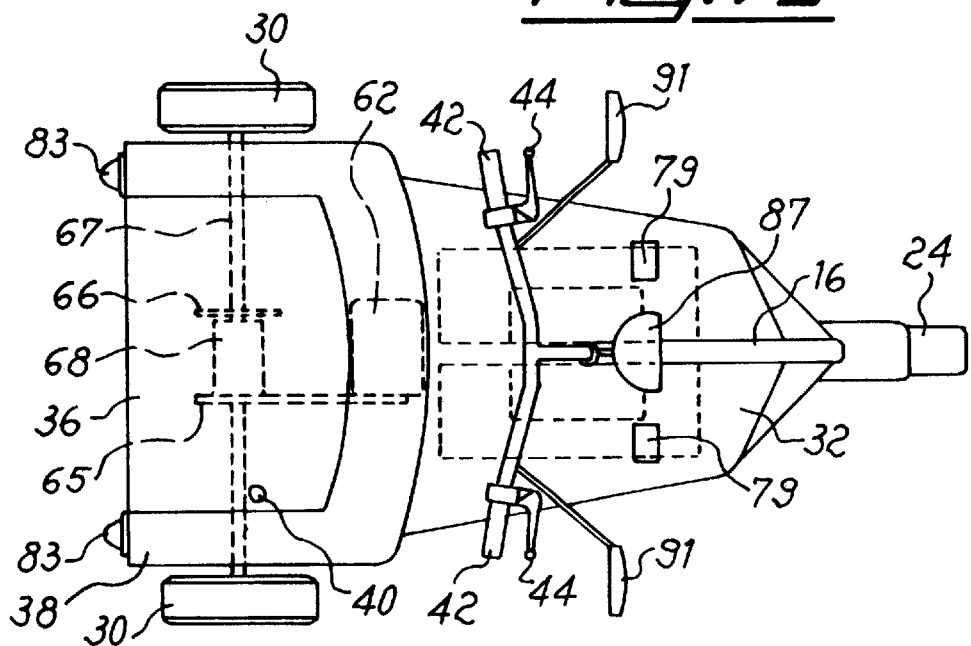

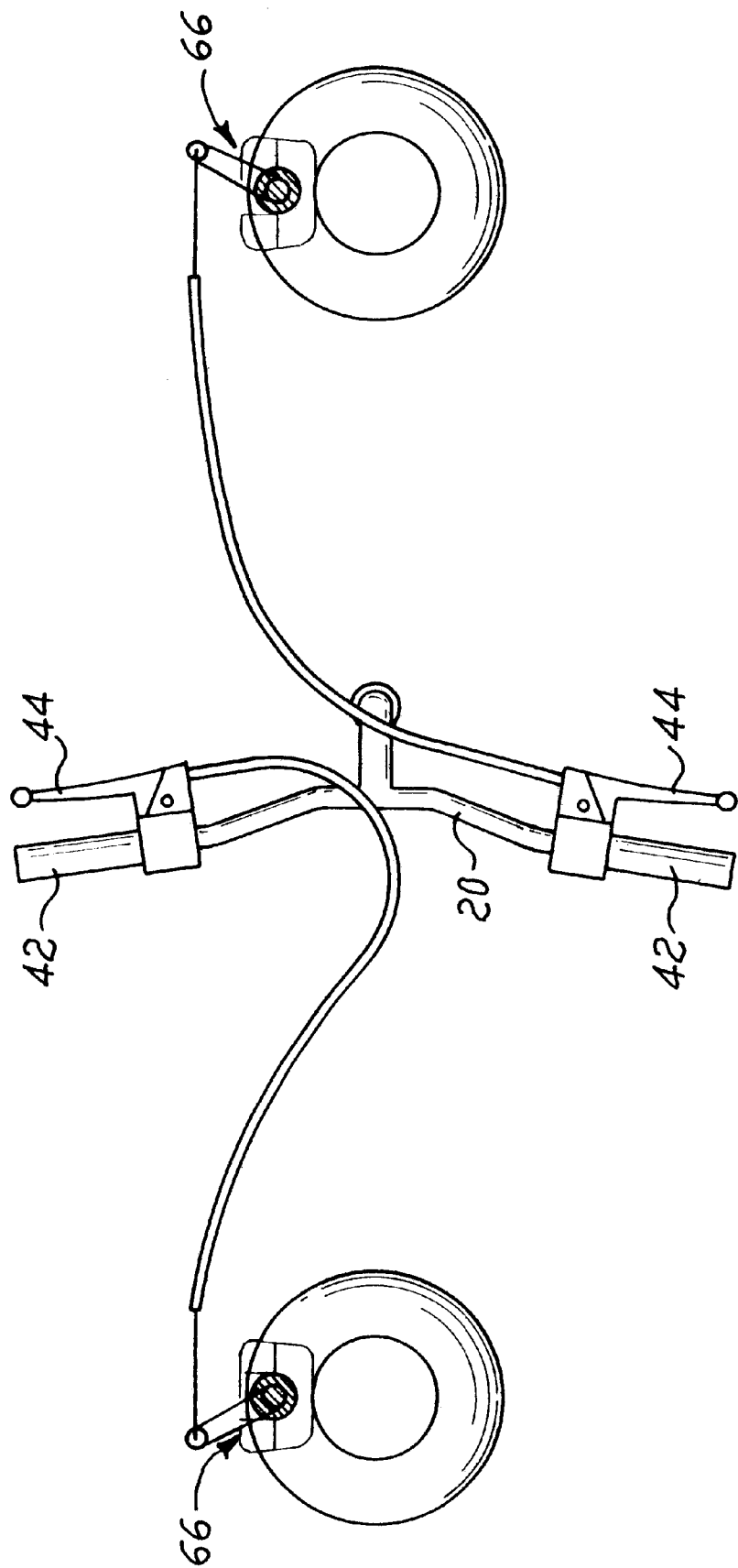

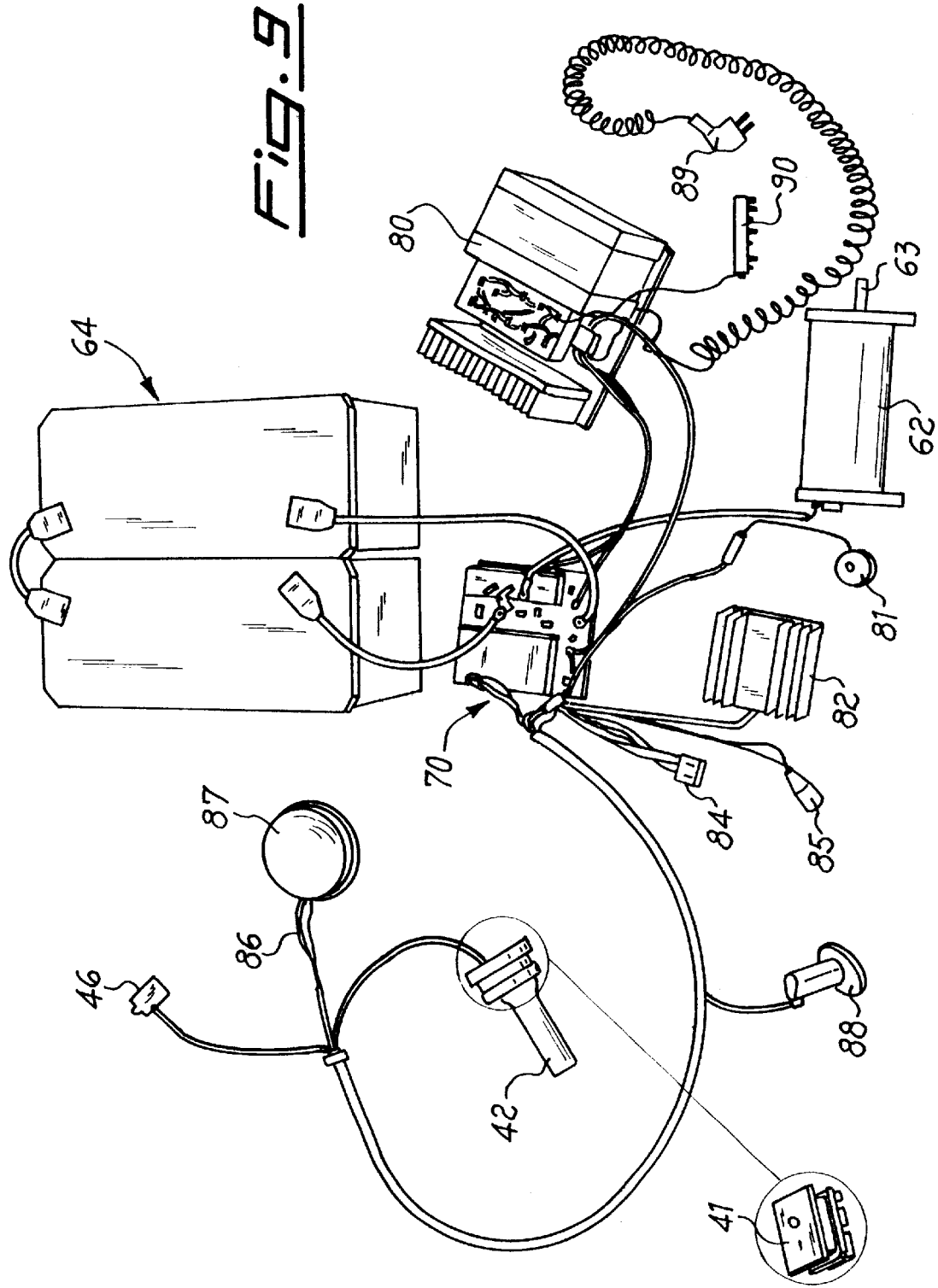

SMALL ELECTRIC VEHICLE

This application is a continuation in part of application Ser. No. 08/933,893, filed Sep. 19, 1997, now abandoned.

BACKGROUND OF THE INVENTION

1. Field of the Invention

The present invention relates to a small electric vehicle. More particularly, the present invention relates to an electric locomotion means especially suitable for use by an individual for short indoor or outdoor trips which is extremely compact and easy to handle and operate.

2. Description of the Prior Art

The need for utilizing engine-driven locomotion means for short trips at present is keenly felt.

However, there are difficulties connected therewith, for instance maneuvering such vehicles and parking spaces therefor, as well as the time which is required for such maneuvering and parking. Further, the problems of such quick trips often disheartens people from using engine-driven-means. In addition, the movement of conventional vehicles, in particular cars, is not allowed in certain areas, because of environmental pollution problems. However, under present economic and social conditions, short and quick trips are necessary in many different situations and within the most different contexts. In city centers, internal or external areas of factories, sports and commercial facilities and airports, an engine driven, compact and easily usable means is desirable either for people transport or for service activities, such as surveillance or the like. The problem is felt also in the agricultural sector, for activities associated with the control of cultivations carried out in large areas and which is worsened by the very nature of the terrain, which is rough, and therefore the use of cars would not be practical. The solutions that are available at present for short trips or transport in the aforementioned situations reside in the use of electric or internal combustion engine means, especially designed with the aim of reducing as much as possible encumbrances. In any case, they are always cabin-vehicles with one or more seats, which are always of a rather large size with traditional operating and driving systems and are therefore substantially complicated.

The use of the conventional motorcycle in some situations, such as for instance in the country, has substantial limitations and drawbacks due to the soil morphology and it may even be dangerous for users because of the inherent instability of the motorcycle.

SUMMARY OF THE INVENTION

The object of this invention is to overcome the drawbacks mentioned hereinabove.

More particularly, the object of this invention is to provide an engine-driven vehicle of extremely contained size, easy to handle and operate, suitable for different uses, both for work and other reasons.

Advantageously, the engine-driven vehicle according to the present invention is provided in the rear with a small-sized board on which the user stays, and the user in an upright position during the trip, reaches easily the various controls for the movement and direction of the vehicle.

A further object of the invention is to provide a vehicle as defined above, suitable to ensure the necessary safety for users in the various situations in which it is used.

A further object of the invention is to put at the disposal of users an engine-driven vehicle that can ensure a high level of reliability, which can also be manufactured easily and economically.

These and still other objects are achieved by the engine-driven vehicle of the present invention, which comprises a supporting frame for a propulsive unit, comprising a plurality of tubular elements and/or bars tied to one another by welding or equivalent means, a tubular body integral with the front part of the frame and extending angularly upwardly in the direction of the rear of the same, wherein a rod is located which is connected at the lower end to at least a front wheel or sliding means, and, at the opposite end to a handle bar, at least a pair of rear wheels, connected to said frame and to the motor shaft of an electric motor, and a board located between the rear wheels and on which the driver stays in an upright position.

BRIEF DESCRIPTION OF THE DRAWING FIGURES

The construction and functional characteristics of the electric vehicle of the present invention will be better understood from the following description, wherein reference is made to the attached drawings which represent a preferred non-limiting embodiment, as well as other embodiments for many alternative uses, and wherein:

FIG. 7A is a schematic side view of the electric vehicle of the invention;

FIG. 7B is a top schematic view of the electric vehicle of the invention;

FIG. 8 is a schematic representation of the brakes and controls therefor;

FIG. 9 is a schematic view of the electric components and controls; and

DETAILED DESCRIPTION OF THE PREFERRED EMBODIMENT

Figure 1:
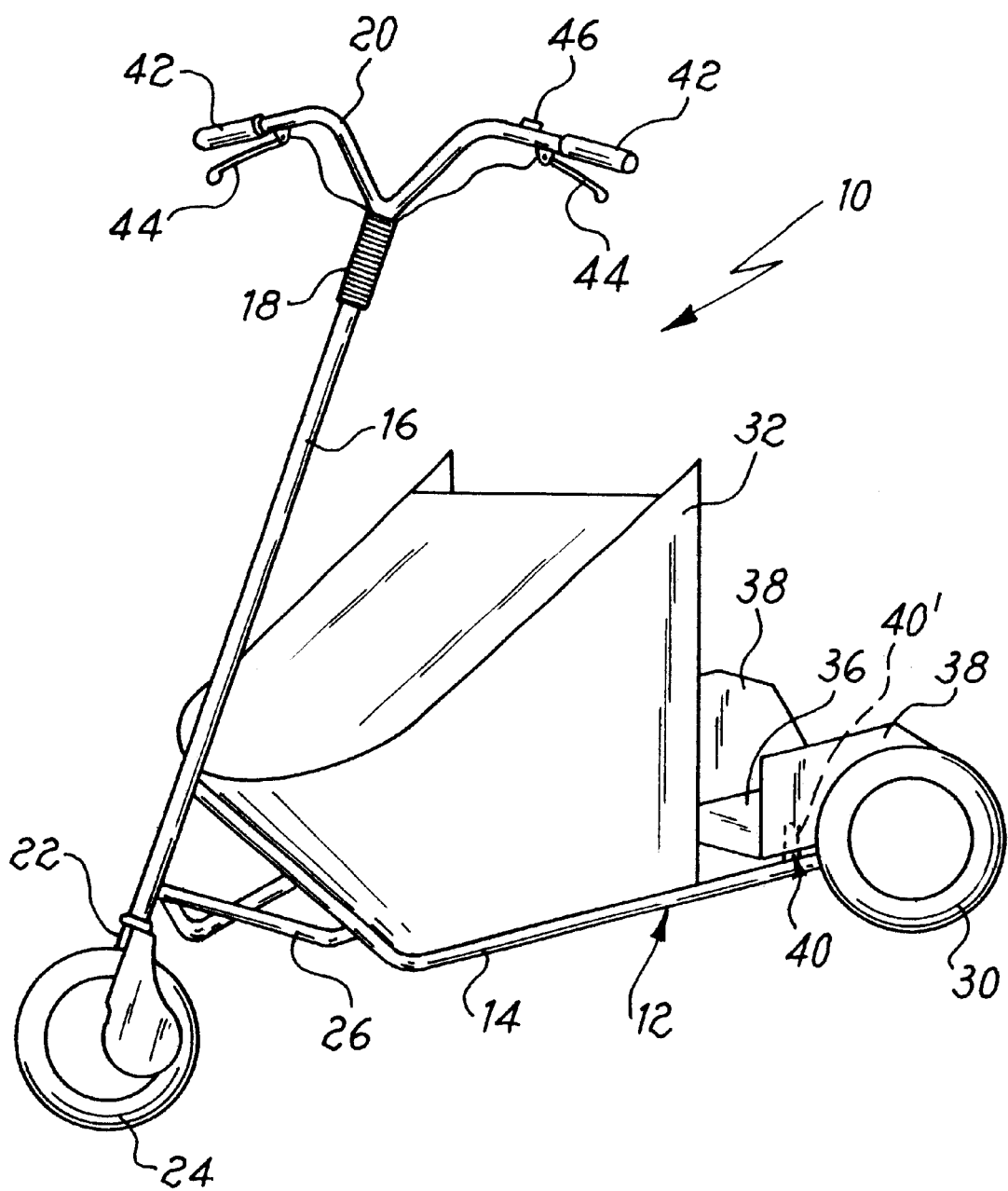
FIG. 1 is a schematic perspective view of one embodiment of the electric vehicle of the present invention.
Figure 2:
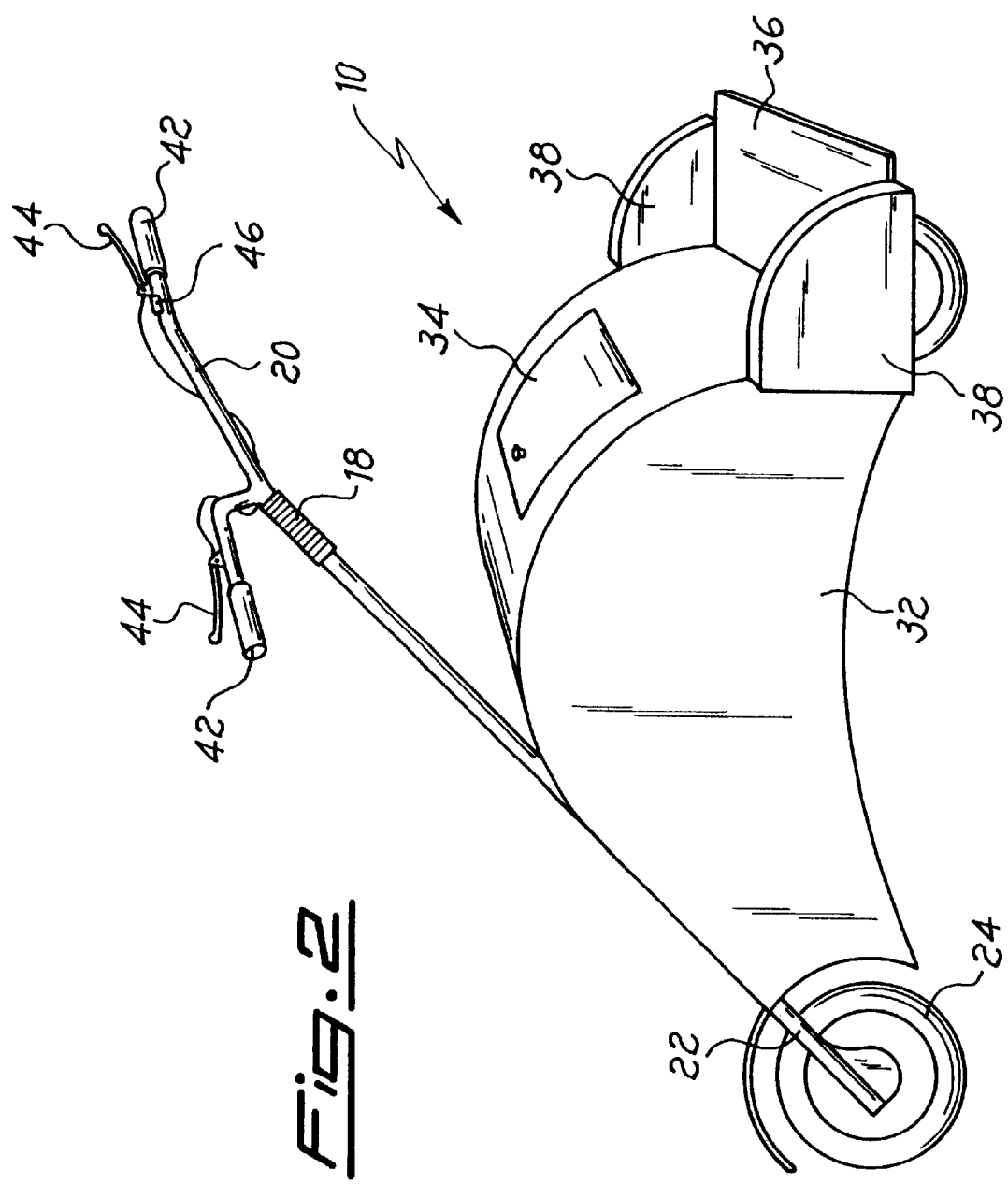
FIG. 2 is a schematic perspective view of another embodiment of the vehicle with reference in particular to the development of the body integrating the propulsive unit.

With reference to FIGS. 1–6, the electric vehicle of the present invention, indicated generally by the numeral 10, is basically constituted by a supporting frame 12 advantageously formed by a plurality of tubular metal elements 14 which are integral to one another by welding or equivalent means. The tubular elements 14 which define as a whole a quadrangular, preferably trapezoidal frame, are bent upwardly in the front part and converge in the direction of the longitudinal axis of frame 12 to connect with another tubular element 16. The latter extends angularly upwards and constitutes the seat for housing a connecting joint 18 which, at the upper end, is connected to a handle bar 20 or the like, and is tied, at the opposite end, to a fork 22, to which at least one front wheel 24 is caused to be integral by known means.

The supporting frame 12, in the front part connecting with the tubular element 16, preferably comprises connecting elements 26, either tubular or bar-shaped, suitable to connect and strengthen the frame 12.

Elements 14, 16, 26 which form as a whole the frame 12 may have any cross-section and are made of steel or other suitable materials. The portion of the frame 12, which extends horizontally, forms the supporting base for a propulsive unit, constituted by an electric motor 62, tied to the tubular elements 14 by means known in the art, for instance bolts with the possible interposition of an elastomeric support. The electric motor 62 is provided with a shaft 63 protruding from the motor.

The frame 12, at the back end of each tubular element 14, supports rear wheels 30 whose axle is connected to the motor shaft 63 protruding from the electric motor 62 by any conventional manner, such as by a driving belt 65.

The electric motor 62, which is fixed to the supporting frame 12, is shielded, at least on the top and along the periphery, by a carcass or a cover 32, tied to the same frame on several points with bolts, welding or the like. The cover 32 includes a front panel. The cover, the configuration of which is suggested by way of a non-limiting example only in two alternative forms in the figures, has at least one fully or partly openable or removable door. In FIGS. 2–5 the tiltable or removable door is designated by numeral 34. In the same figures, the cover 32 has such a configuration as to fully shield also the supporting frame 12 and the many tubular elements that make it up; differently from the embodiment shown by way of example in FIG. 1 in which the frame remains visible.

According to a preferred embodiment, the cover 32 is in the form of a biga namely a two-horse chariot used by the ancient Romans. Between the two rear wheels 30, a small metal board 36 is fixed, supported by the opposite tubular elements 14 of the frame 12, to which it is caused to be integral by means of screws, bolts or the like.

According to a preferred embodiment, the longitudinal extension of the board 36 is limited to the portion between the rear of cover 32 and the free end of the tubular elements 14, so that this board 36 does not extend beyond the rear wheels 30, and does not protrude with respect to the same. Preferably, the board 36 is provided with opposite side walls 38, having a limited height, and an orthogonal oriented portion with respect to the board 36, which circumscribes the rear wheels 30 at the sides.

According to an advantageous characteristic of the invention, an electric contact such as a microswitch 40 or the like is provided having a contact pin 40' which protrudes from the upper surface of the board 36. The microswitch 40 connects the electric circuit of the electric motor 62 to a conventional battery 64 and automatically closes the related circuit the moment the user steps on the board 36 and the foot pushes on the contact pin 40', lowering it.

The vehicle 10 of the present invention includes a speed control means comprising brakes 66, preferably disc brakes, arranged on the front wheel 24 and on the axle 67 of the rear wheels 30, near the differential gears 68, and operable by brake levers 44 located at the ends of the handle bar 20.

At least one of the brake levers 44 may be provided with a locking means located on the handle bar 20 to jam the brake during parking of the vehicle. The speed control means also comprises a microprocessor electronic control system which is well known and available on the market, for example, the model 4QHF 2D produced and sold by ELEKTROSYSTEM S.r.l. of Italy.

The microprocessor electronic control system 70 is fixed to the frame and connected to the battery 64, to the motor 62, to the microswitch 40, to a battery charger 80, to a step-down transformer 82, to at least one of the two knobs 42 located at one of the ends of the handle bar 20, to cables 84 for the rear lights 83, to cables 85 for the directional lights 79, to cables 86 for the front light 87, to cables for the light and directional light switch 46, located on the handle bar 20, and to cables for a warning horn 88.

The microprocessor electronic control system 70 is also provided with a reverse motion unit 72, an acceleration means 74, connected to at least one of the knobs 42, and with a general safety contact breaker 76 mounted on the carcass or cover 32 in an upper or frontal position for the user.

The acceleration means 74 comprises a current varying device, such as a potentiometer, operated by the rotation of one of the knobs 42. The current applied to the motor 62 and the resulting velocity can be varied by rotating the one knob 42. The rotation of the one knob 42 moves the potentiometer 74 and varies the amount of current fed to the motor 62 from the battery 64 through the microprocessor electronic control system 70.

The acceleration of the motor obtained by the rotation of the one knob 42 allows to achieve the maximum velocity in a gradual and homogeneous way. The current limiting device allows to regulate and to limit, as one wishes, the maximum current fed to the motor and consequently its velocity.

The one knob 42 is also provided with a return spring 43, with a micro-switch 45 opening the electric contact when the knob is in the closed position and with an LED 41 indicating when the current is fed to the motor 62.

Reverse motion is achieved by moving a lever 72' of the reverse motion unit 72 which is a reversing switch inverting the rotation direction of the motor shaft 63. When the lever 72' is moved, the microprocessor electronic control system 70 inverts the current polarity fed to the motor 62 and, therefore, reverses the direction of motion of the motor shaft 63.

A buzzer 81, connected to the microprocessor electronic control system 70 indicates when the vehicle is in reverse motion.

The battery charger 80 is at high frequency, continuously monitors the charge level of the battery 64 and assures the minimum charge level necessary for a long duration of the battery. It comprises a cable provided with a plug 89 for the electrical connection to an electrical line and with a charge indicator 90 having three LEDs indicating when the battery is charged, discharged or being charged. The microprocessor electronic control system 70 used in the vehicle of the present invention allows partial recovery of kinetic energy during deceleration, downhill travel when the knob is released, during braking and when motion is reversed. The microprocessor control system 70 transforms the partially recovered kinetic energy into electric energy which is stored in the battery 64. A heat limiting device operating at a settable temperature level such as 70–80° C. can be provided.

The activation of vehicle 10 is substantially direct, given the provision and location of the above mentioned members, whereby the user, stepping on board 36, closes the contact breaker 76 and by pressing his foot on contact pin 40' of the microswitch 40, causes the start of the vehicle. The velocity of the vehicle can be varied by rotating the one knob 42 thereby varying the amount of current fed to the motor 62 from the battery 64 through the potentiometer 74 and the microprocessor electronic control system 70.

The inclination of the tubular element 16 which is connected to the front wheel 24 and to the handle bar 20, which is variable according to the size of the cover 32, places the handle bar 20 in the best position for the user, who remains in an upright position on the board 36. In order to step down from the latter once the vehicle has stopped, the electric contact of the microswitch 40 is opened, by removing the foot of the user from the contact pin 40', and as a consequence interruption of the electric circuit occurs. The rear wheels 30 are provided with differential gears 68.

The vehicle 10 of the present invention can be provided with at least one rearview mirror 91 arranged at an end of the handle bar 20.

Figure 3:
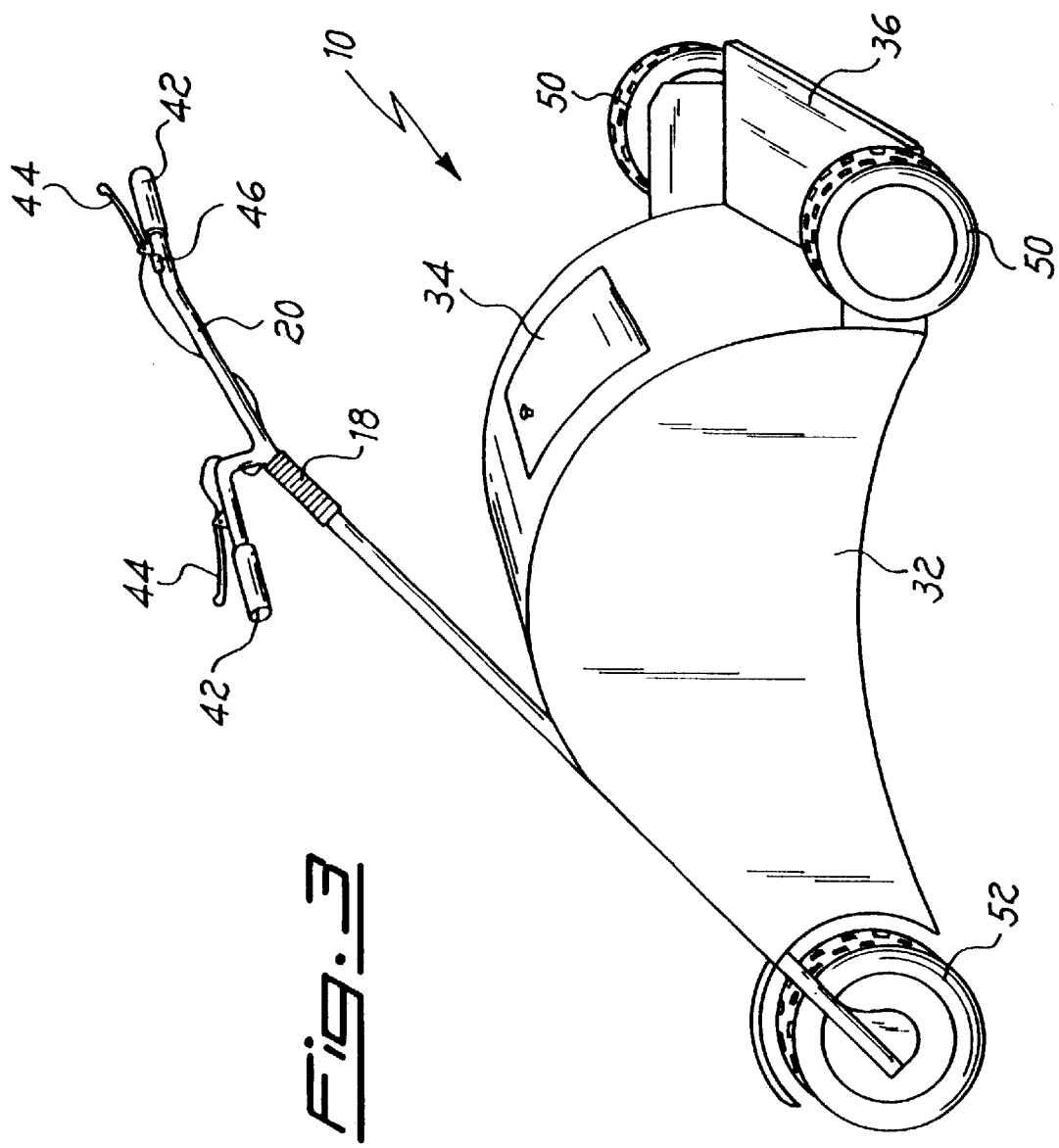
FIG. 3 is a schematic perspective view of the same vehicle of the preceding figures, provided by way of example with greater section wheels for use on rough terrain.
Figure 4:
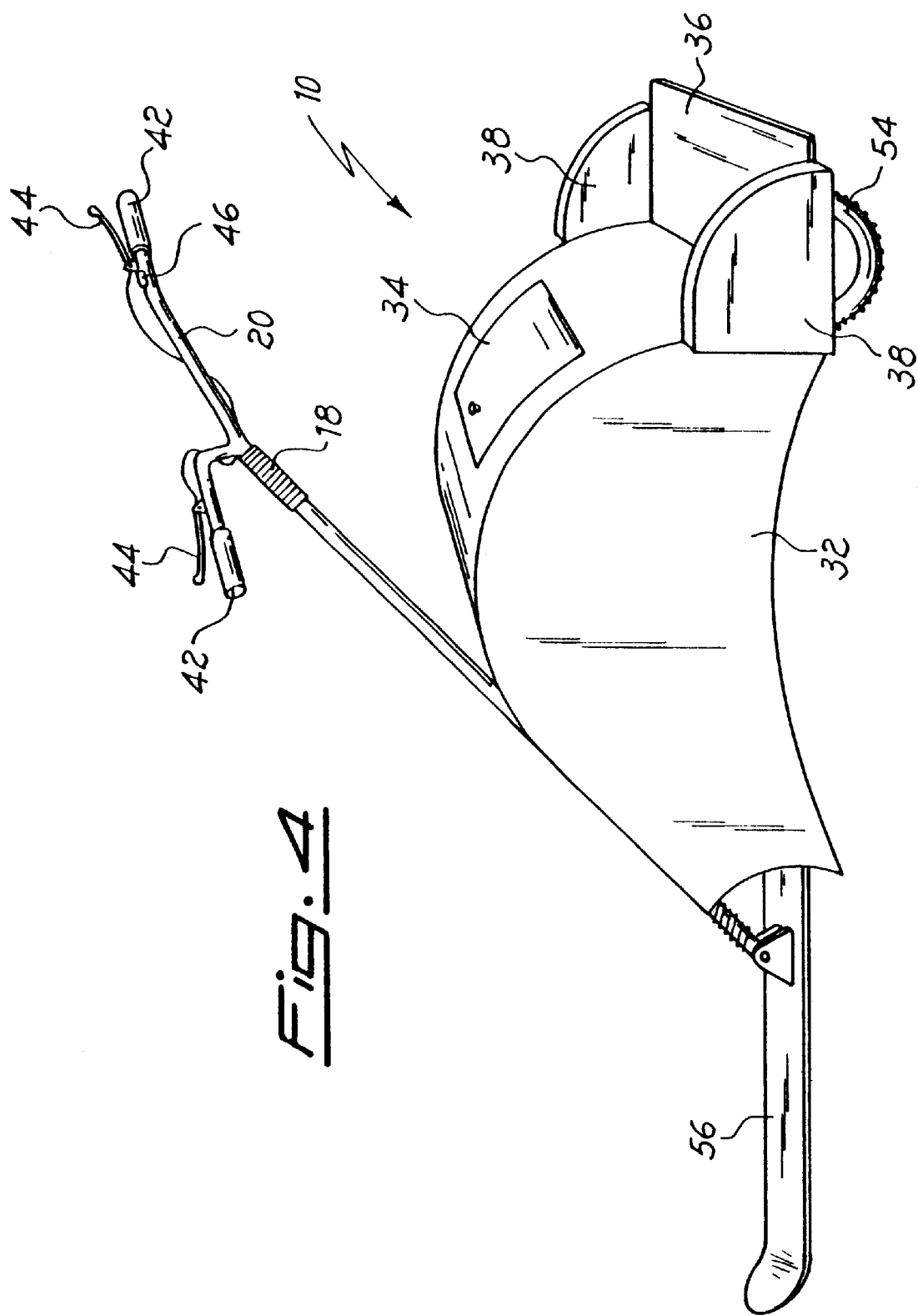
FIG. 4 is a schematic perspective view of the same vehicle of FIGS. 2 and 3 equipped by way of example, for use on snow covered ground.
Figure 5:
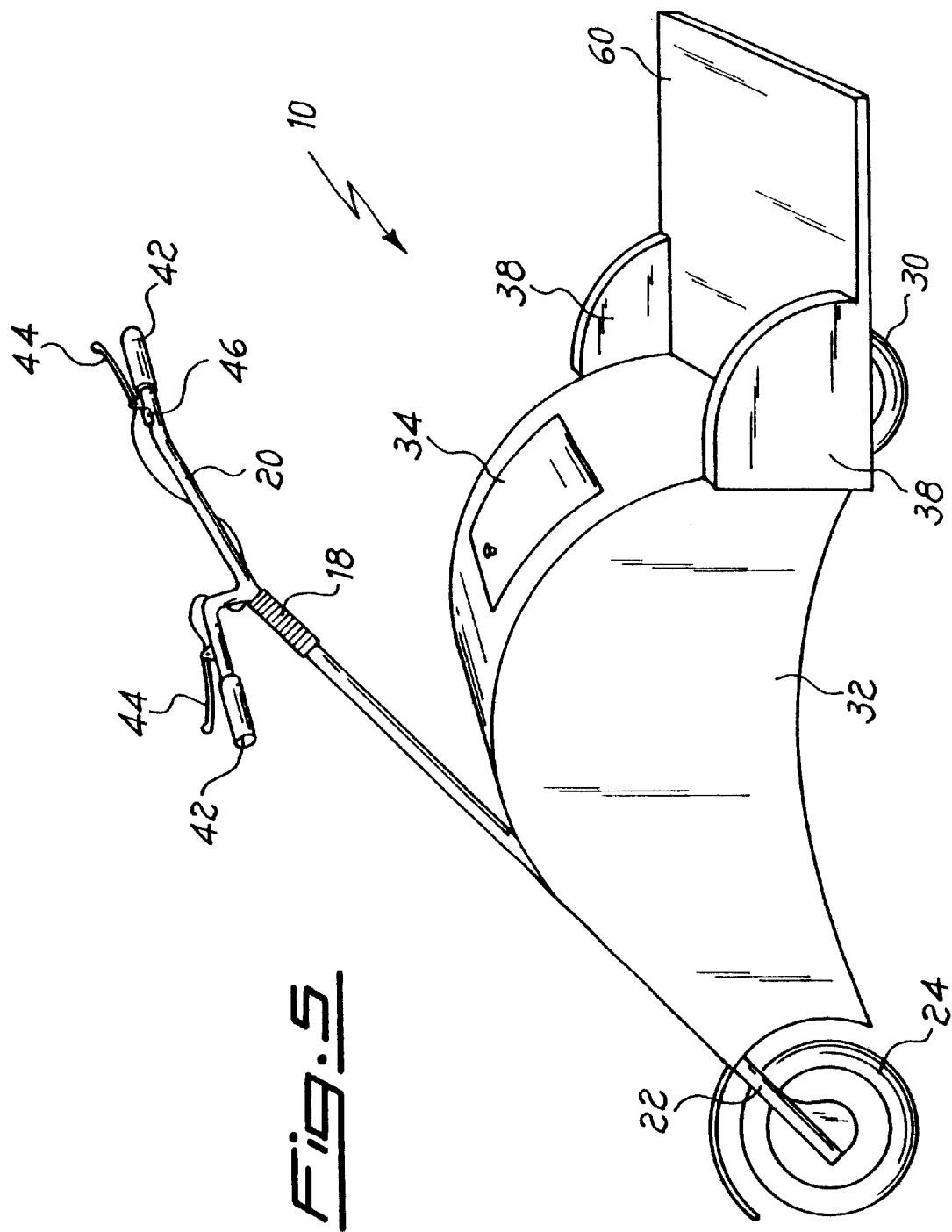
FIG. 5 is a schematic perspective view of the same vehicle of the preceding figures, provided by way of example, with a back platform of greater size, for use by disabled people.
Figure 6:
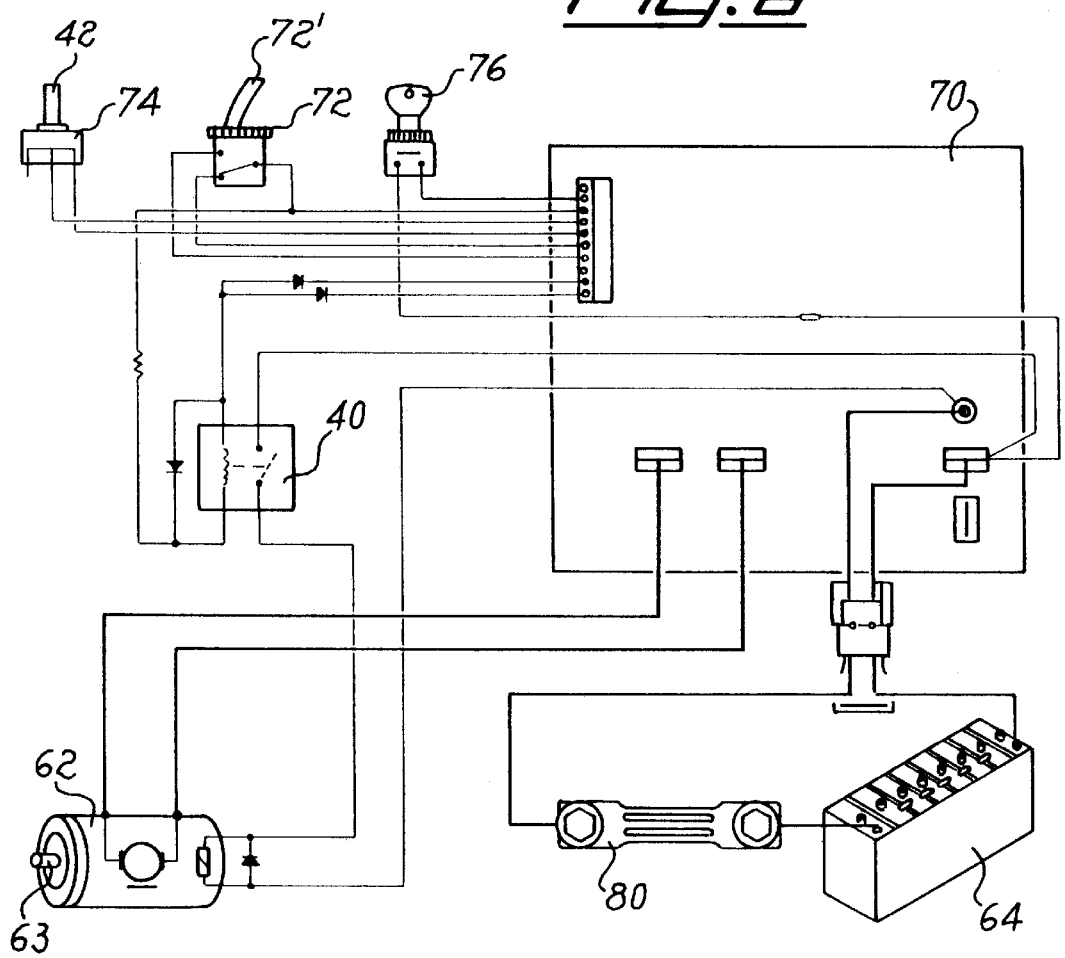
FIG. 6 is a schematic diagram of the microprocessor electronic control system.
Figure 10:
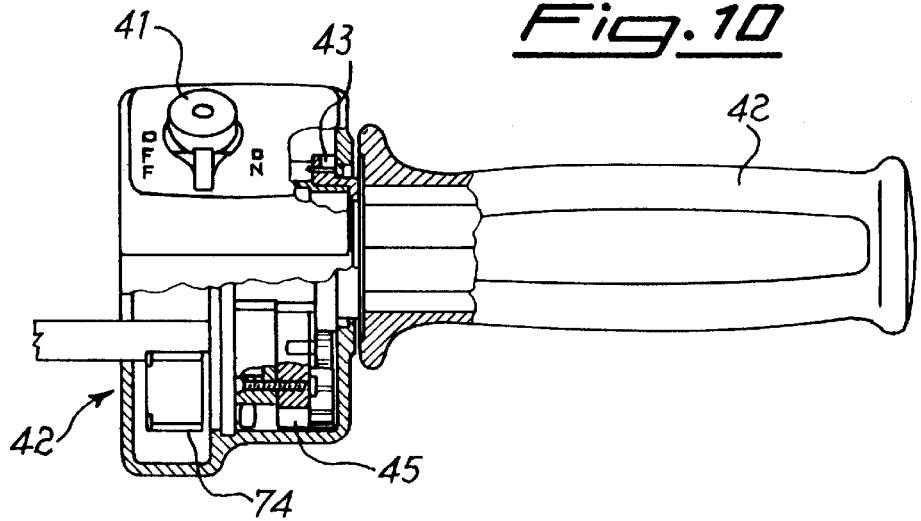
FIG. 10 is a cross sectional view of an acceleration knob.

FIGS. 3, 4 and 5 illustrate schematically some possible different embodiments of the vehicle 10 of the present invention. These embodiments relate, in particular, to the adoption of wheels or sliding means fit for special terrain, and the adoption of a larger board 36 for use by a specific class of users of the vehicle, the general structure and working of the latter being the same.

The embodiment of FIG. 3 takes up almost entirely the structural characteristics of the above described structures since the only important modification, stressed in order to underline the versatility of the vehicle 10, is constituted by the presence of rear wheels 50 and front wheel 52 having a block-patterned tread for use of the vehicle on rough terrain, for instance in agriculture. The upright position of the vehicle driver is, in this instance, particularly advantageous because it allows, besides the reduced size of the vehicle, the optimum and direct view of cultivations, especially of the inflorescence which emerge at the top of stems.

The embodiment shown in FIG. 4 is suitable for the vehicle 10 to be used on snow covered ground, in situations not necessarily connected to agriculture, for instance the use of a vehicle, having the structure and form defined in this embodiment, connecting routes on mountain-sides, for communication and/or transport reasons.

For this purpose, the vehicle 10 is provided with rear wheels 54 tracked or in any case specifically suitable for snow, and with at least one front runner 56 replacing the conventional rubber wheel, this runner being orientable through the action of the same handle bar 20.

The embodiment of FIG. 5 is suitable for the vehicle 10 being used for the transport over short distances of physically disabled people that are wheelchair bound. The board 60, in this case, is provided with a longitudinal extension greater than the previous extensions, so as to house the wheelchair of the disabled individual who remains seated on the wheelchair. Access by the person to the supporting board 60, which is raised by a limited height with respect to the ground, does not require complicated maneuvers, and the handle bar 20 with the associated controls may be inclined in a position suitable for controlling the vehicle 10. Obviously, both in the present embodiment and in the one or more of the others previously described, the inclination of the tubular element 16, carrying at the upper end the handle bar 20, can be adapted to the specific requirements through the connecting joint 18 and/or through the connecting joint 18 telescopically extending or reducing the length of the tubular element 16 with means known in the art.

All of the above described embodiments may also be provided with elastic shock absorbers or conventional suspensions arranged on one or more of the wheels or sliding means, as well as with light and/or sound signals, especially when the vehicles are used in towns. From the foregoing the advantages achieved by the present invention are obvious.

The electric vehicle of the present invention allows the making of quick and safe transport, occupies reduced space especially because of its structure which requires an upright position by the user.

The easy and immediate activation of the vehicle, as a result of the automatic closing of the electric circuit thanks to the contact automatically actionable through the pressed board, is particularly advantageous. Moreover, the use of the microprocessor electronic control system 70 with the recovery of kinetic energy during deceleration, downhill travel and braking and transforming it into electric energy and the particular type of the battery charger, make the vehicle of the present invention usable for a long period of time without recharging the battery.

Although the invention has been described hereinabove in conjunction with specific embodiments offered for illustrative purposes only, it is evident that many alternatives and modifications will be apparent to those skilled in the art, in light of the foregoing description.

Accordingly, the invention is intended to embrace all of the alternatives and modifications that fall within the scope of the appended claims. For instance, the vehicle may be provided with two front wheels, spaced from one another or joined, and/or with a steering wheel instead of the handle bar. The vehicle, while keeping to the above described structural characteristics, may have a different form of the cover 32 covering the motor, battery and electronic control system, of the wheels, of the back platform and/or other components to configure modifications specially utilizable in different situations and suitable to take upon also two people in upright position.

What is claimed is:

1. A small electric vehicle comprising:
   a support frame (12) having a front part and a back part and comprising a plurality of first tubular elements (14, 26) tied to one another;
   a second tubular element (16) having a lower end and and an upper end extending upwardly, said lower end being integral with the front part of the frame (12);
   at least one steerable front wheel (24, 52) or sliding means (56) connected to the lower end of said second tubular element (16);
   a handle bar (20) connected to the upper end of said second tubular element (16) and provided at opposite ends with a first and a second knob (42) and with brake levers (44);
   a pair of rear wheels (30, 50, 54) connected to the back part of said support frame (12);
   a board (36, 60) fixed to the support frame (12) between said rear wheels (30) and configured to support at least one standing user or driver in an upright position or a handicapped person;
   a microswitch (40) having a contact pin (40') protruding from an upper surface of the board (36, 60);
   an electric motor (62) having a motor shaft (63) connected to the rear wheels; said electric motor being connected to a battery (64);
   a battery charger (80);
   a control means including brakes and a speed control means connected to said motor to control the speed of said vehicle and comprising a microprocessor electronic control system (70) connected to the motor (62), to the battery (64), to the microswitch (40) of the board (36, 60), to the battery charger (80) and to at least one of the knobs (42);

said microprocessor electronic control system (70) is connected with an acceleration means (74), operable in response to the rotation of said one knob (42) to control said electric motor.

2. The vehicle according to claim 1, wherein said second tubular element (16) angularly extends upwardly in the direction of the back part of said frame (12) to place the handle bar (20) in the best position of the user.

3. The vehicle according to claim 1, wherein the brakes are disc brakes (66) arranged on the front wheel (24) and on an axle (67) of the rear wheels (30) and are operable by the brake levers (44).

4. The vehicle according to claim 1, wherein the board (36) has a longitudinal extension up to the rear wheels (30) and not protruding with respect to the same.

5. The vehicle according to claim 1, wherein the board (60) extends beyond the rear wheels (30) and it is provided with a longitudinal extension to house a wheeled chair for a disabled person.

6. The vehicle according to claim 1, comprising rear (83) and front (87) lights, directional arrows (79), a step-down transformer (82) and warning horn (88), all electrically connected to the microprocessor electronic control system (70).

7. The vehicle according to claim 1, wherein the acceleration means (74) comprises a potentiometer arranged in one knob (42) and operated by the rotation of the one knob (42).

8. The vehicle according to claim 1, wherein the one knob is provided with a return spring (43) with a microswitch (45) opening electric contact when the one knob is in a closed position and with an LED (41) indicating when current is fed to the motor (62).

9. The vehicle according to claim 1, comprising a reverse motion unit comprising a reversing switch (72) connected to the microprocessor electronic control system (70) reversing the current polarity fed to the motor (62).

10. The vehicle according to claim 1, wherein the battery charger (80) is provided with an electrical plug (89) for connection to an electrical source to charge the battery.

11. The vehicle according to claim 1, wherein the contact pin (40') of the microswitch (40) is operated by the foot of the user.

12. The vehicle according to claim 1, comprising a contact breaker (76) connected to the microprocessor electronic control system (70).

* * * * *